United States Patent [19]

Salguero

[11] 4,055,156
[45] Oct. 25, 1977

[54] ROTARY ENGINE

[75] Inventor: Hugo A. Terán Salguero, La Paz, Bolivia

[73] Assignee: Gundlach, S.A., Bolivia

[21] Appl. No.: 666,500

[22] Filed: Mar. 12, 1976

[51] Int. Cl.$^2$ ............................................. F02B 53/08
[52] U.S. Cl. ................................ 123/8.33; 418/61 R; 418/221; 123/8.35
[58] Field of Search ..................... 123/8.33, 8.45, 8.35; 418/61 R, 221

[56] References Cited

U.S. PATENT DOCUMENTS

| 866,767 | 9/1907 | Bauter | 418/231 |
|---|---|---|---|
| 1,809,051 | 6/1931 | Luther | 418/231 |
| 2,371,514 | 3/1945 | Gold et al. | 418/231 |
| 3,636,930 | 1/1972 | Okada | 123/8.45 |
| 3,820,513 | 6/1974 | Buettner | 123/8.33 |
| 3,885,531 | 5/1975 | Zollenkopf | 123/8.45 |

Primary Examiner—Carlton R. Croyle
Assistant Examiner—Robert E. Garrett
Attorney, Agent, or Firm—Schuyler, Birch, Swindler, McKie & Beckett

[57] ABSTRACT

An internal combustion engine of the rotary type having an elliptical housing within which charge-carrying pistons move. The engine includes a stationary central portion having an elliptical outer surface about which the pistons move. A pair of gate valves slide longitudinally of the central portion, dividing the working chamber into separate compression and expansion zones. A gear system maintains a particular orientation of the pistons. The valves are interconnected to open and close at the proper time to allow the pistons, with the trapped, compressed fuel-air charge carried therein, to pass from the compression zone to the expansion zone.

15 Claims, 10 Drawing Figures

FIG. 9
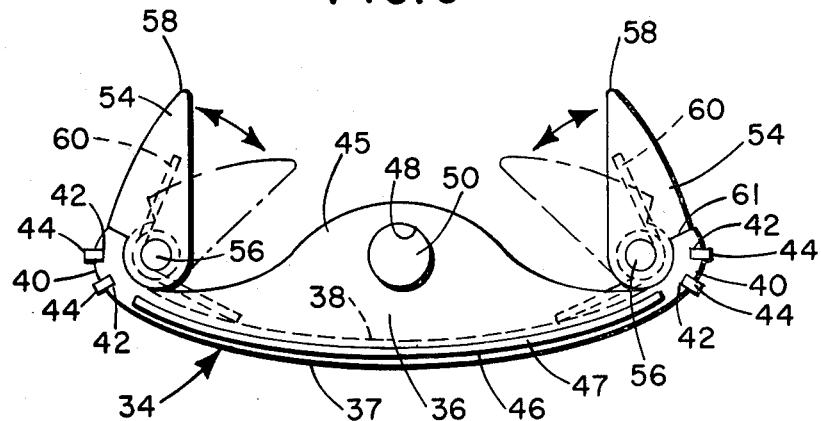
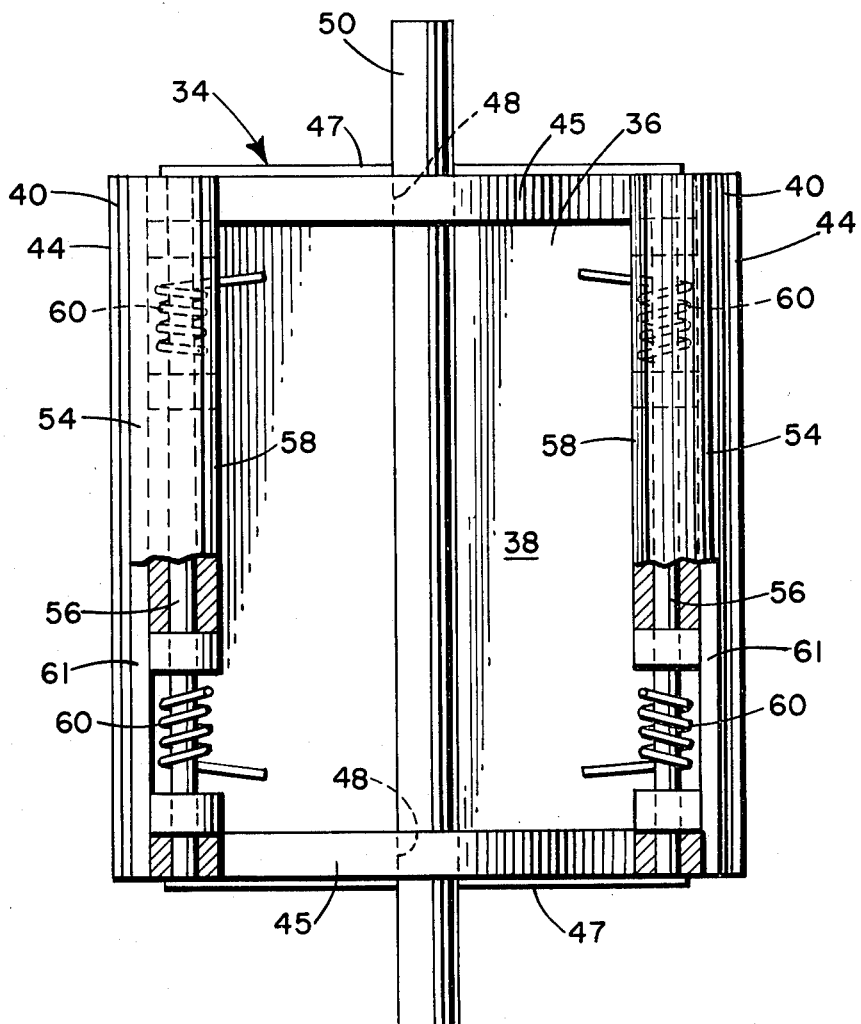
FIG. 10

ROTARY ENGINE

BACKGROUND OF THE INVENTION

1. Field of the Invention

The invention relates to internal combustion engines and, more particularly, to an internal combustion engine of the rotary type wherein charge-carrying pistons orbit about a stationary, central portion of the engine.

2. Description of the Prior Art

In the internal combustion engine art, rotary engines are well known. A convenient example is the Wankel engine in which an internally splined rotor having three piston faces rotates about a splined output shaft. In engines of rotary construction, a very favorable horsepower-to-weight ratio is attainable. Moreover, because motion of the rotor is primarily rotational instead of reciprocal, engine vibration and stresses on engine parts are minimized greatly. This is in marked comparison to a conventional piston engine in which efficiency is low and vibration and stresses are high.

In light of the above-mentioned advantages of rotary engines, it is an object of the invention to provide a new and improved internal combustion engine of the rotary type having superior operating characteristics.

SUMMARY OF THE INVENTION

In carrying out the invention, in one form thereof, an internal combustion engine of the rotary type includes a housing, the elliptical inner surface of which defines an outer portion of a working chamber within which charge-carrying pistons move. The engine also includes a stationary central portion, the generally outer surface of which defines an inner portion of the working chamber and about which the pistons move. A pair of gate valves slide longitudinally of the major axis of the central portion, dividing the working chamber into a compression zone and an expansion zone. The pistons are identical, and each comprises a center section flanked by a pair of pivoted sealing members. Each piston is affixed to a wrist pin, which, in turn, applies power to a crank plate, and hence to an engine output shaft. A system of gears interconnected with the wrist pin on one hand and the crank plate on the other hand causes the pistons to maintain a particular orientation with respect to a reference plane as they orbit the center of the engine. The valves are interconnected to the crank plate so that they open and close at the proper times to allow the pistons to pass between the compression zone and the expansion zone.

The engine operates on a four-stroke cycle. The fuel mixture enters the compression zone via a suitable carburetor or the like. It is compressed therein by one of the pistons acting against a closed valve. At the end of the compression, the charge is captured in the top portion of the piston and is transported therein from the compression zone to the expansion zone, the valve being opened momentarily to permit this action. The valve closes, and a suitable means such as a spark plug fires the charge, driving the piston in a power stroke.

DESCRIPTION OF THE DRAWINGS

FIG. 9 is an enlarged view of the end face of a piston according to the invention.

FIG. 10 is a plan view of the piston of FIG. 9.

DESCRIPTION OF THE PREFERRED EMBODIMENT

Figure 1:
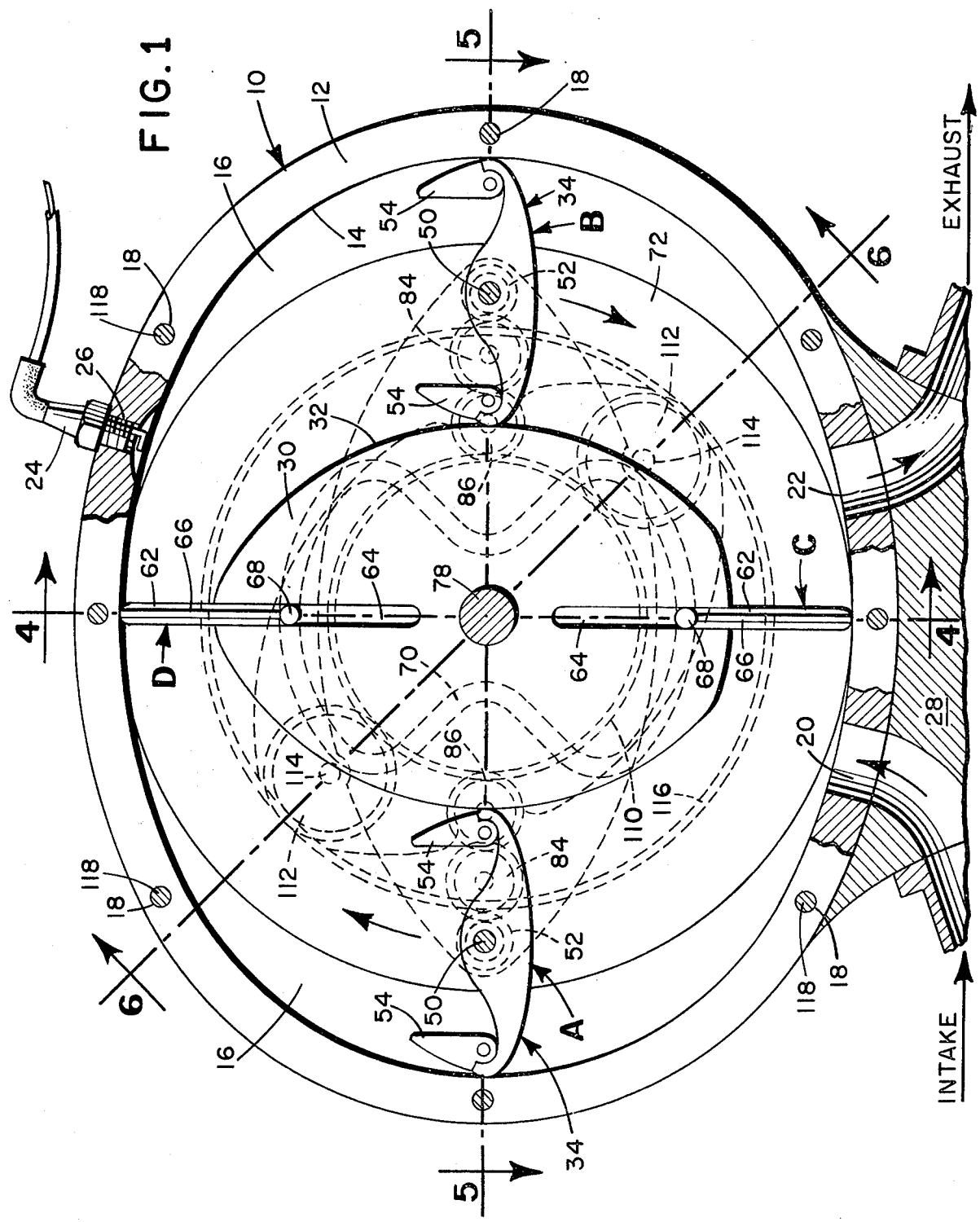
FIG. 1 is a cross-sectional view of one form of an engine according to the invention showing the pistons midway through a four-stroke cycle.
Figure 2:
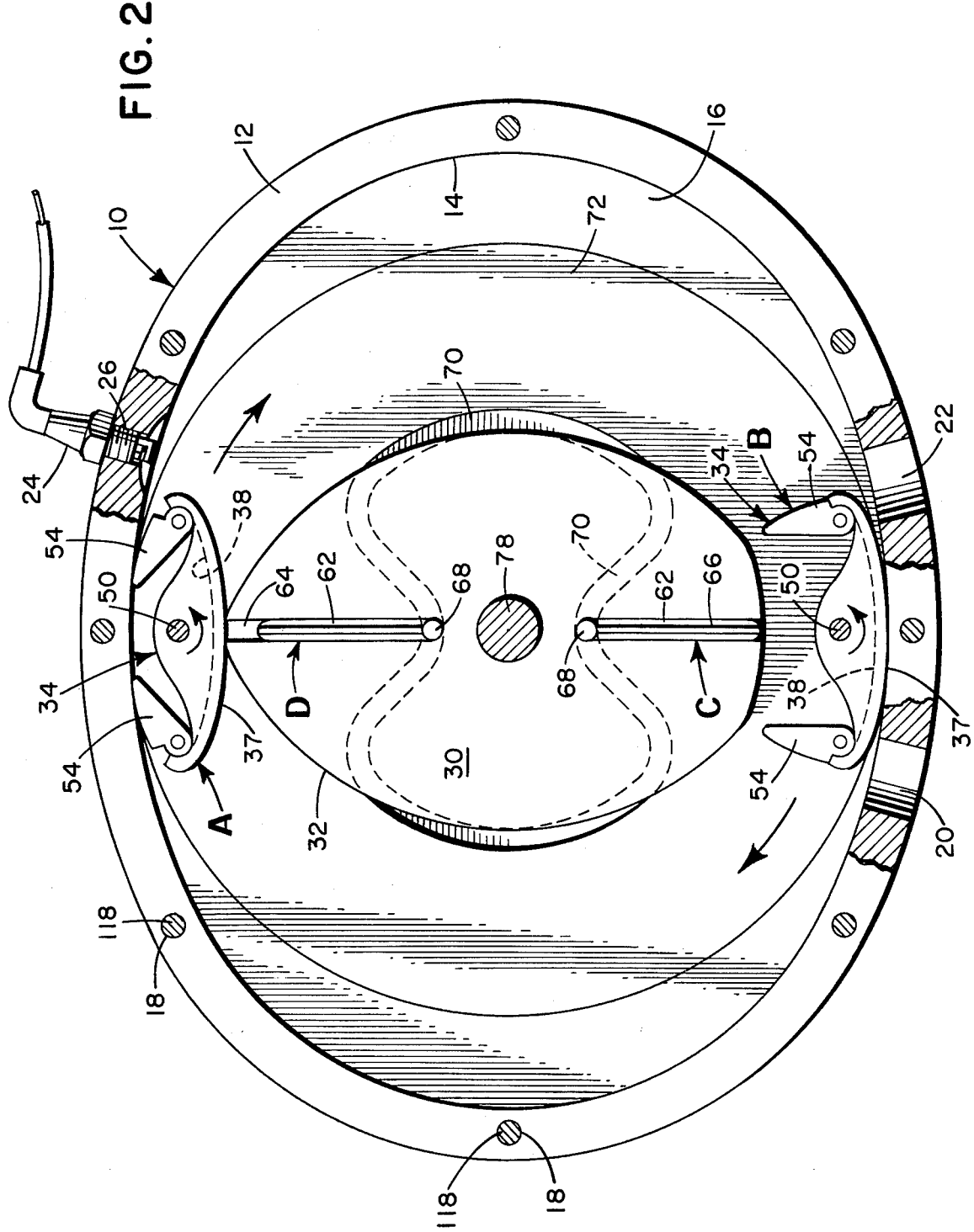
FIG. 2 is a view similar to FIG. 1 wherein the pistons have moved 90° clockwise from that position shown in FIG. 1 and in which certain details have been omitted for clarity.
Figure 3:
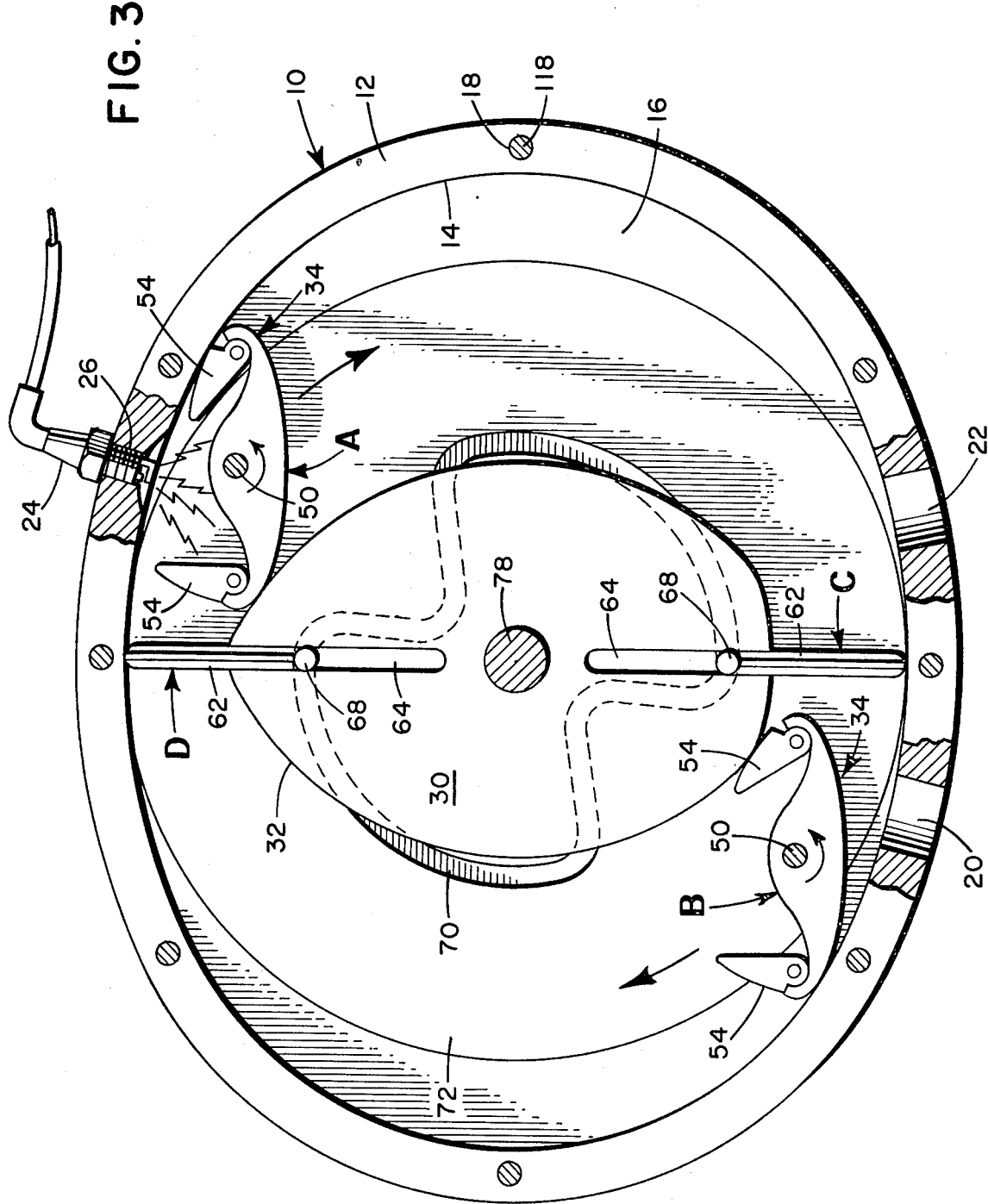
FIG. 3 is a view similar to FIG. 2 wherein the pistons have moved approximately 35° clockwise from that position shown in FIG. 2 and ignition has just occurred.

FIGS. 1-3 show an internal combustion engine 10 of the rotary type. Engine 10 comprises an elliptical housing 12 having, for purposes of illustration only, its major axis disposed horizontally and its minor axis disposed vertically. Housing 12 includes an elliptical inner surface 14 defining the outer portion of a working chamber 16. Housing 12 also is provided with a plurality of transversely extending bolt holes 18 and includes an intake port 20 and an exhaust port 22 both of which can be valveless. A conventional ignition means 24 is provided for the engine, being in communication with chamber 16 through opening 26 in housing 12. Ignition means 24 may be of any well-known type, preferably a conventional spark plug.

Ports 20 and 22 are in fluidic communication with a combined intake and exhaust manifold 28. Manifold 28 also serves as one of several engine supports. Housing 12 and manifold 28 preferably are made of materials which insure desirable thermal expansion and heat transfer characteristics. Inner surface 14 of housing 12 is preferably formed of a material that provides superior wear characteristics.

Engine 10 includes a stationary, generally elliptically shaped central portion 30 having an outer surface 32 defining the inner portion of working chamber 16. Whatever the orientation of housing 12, central portion 30 should have its major and minor axes disposed at right angles to the respective major and minor axes of housing 12. In this case, the major axis of central portion 30 is disposed vertically and its minor axis is disposed horizontally. As with surface 14 of housing 12, surface 32 of central portion 30 preferably is of material that exhibits superior wear characteristics.

Engine 10 is provided with a pair of identical pistons 34 which are shown best by FIGS. 9 and 10 and denominated piston A and B in FIGS. 1-3. Each piston 34 comprises a center section 36 having an arcuate bottom surface 37, a top surface 38 approximating a portion of a sine curve, and rounded side surfaces 40 adapted to engage chamber 16 along a substantial portion of the width thereof. Side surfaces 40 include a plurality of slots 42 extending the length thereof and having sealing means 44 disposed therein. Sealing means 44 are formed of a material such as nitrided iron to insure superior wear characteristics, although this clearly is a matter of design choice. By this construction, piston 34 tightly engages surface 14 and 32 of chamber 16. End faces 45 of piston 34 also are provided with slots 46 having sealing means 47 similar in structure and function to sealing means 44. Further, center section 36 of piston 34 includes a longitudinally extending opening 48. A wrist pin 50 having spur gears 52 at each end nonrotatably engages opening 48 and extends therethrough to carry piston 34 as it moves about central portion 30. Wrist pin 50 also transmits force from piston 34 to other components of the engine and ultimately to an output shaft.

Each piston 34 also includes a pair of pivoted sealing members 54 carried on shafts 56 disposed inwardly of side surfaces 40. By this construction, tip portions 58 of sealing members 54 may engage surfaces 14 and 32 as may be required. It is anticipated that tip members 58 will be formed of an extremely hard substance, such as nitrided iron. In order to urge tip members 58 into a tight, gas-sealing engagement with surfaces 14 and 32, sealing members 54 are acted upon by a plurality of spring members 60. Spring members 60 cause sealing members 54 to pivot outwardly until stop 61 is encountered during certain periods of engine operation. When sealing members 54 are pivoted inwardly, as occurs during certain periods of engine operation, the outer surface of piston 34 defines an elliptical envelope. This is shown best by piston A in FIG. 2 and by the dotted line position of sealing members 54 in FIG. 9.

A pair of gate valves 62 divide chamber 16 into a compression zone and an expansion zone. Gate valves 62, denominated valves C and D in FIGS. 1-3, are disposed within slot 64 as part of central portion 30 and extend across the width of working chamber 16. Gate valves 62 also include sealing means 66 affixed to each end face thereof to effectively seal the sidewalls of chamber 16. Gate valves 62 furthermore include a pair of outwardly extending pins 68 disposed on each end face of gate valve 62 near a radially innermost position thereof. Pins 68 are actuated desmodromically by a rotatable track 70 disposed adjacent each sidewall of the engine and having that profile shown by the dotted lines in FIGS. 1-3. Track 70 is included as part of crank plate 72, the actuation of which will be described subsequently.

Figure 5:
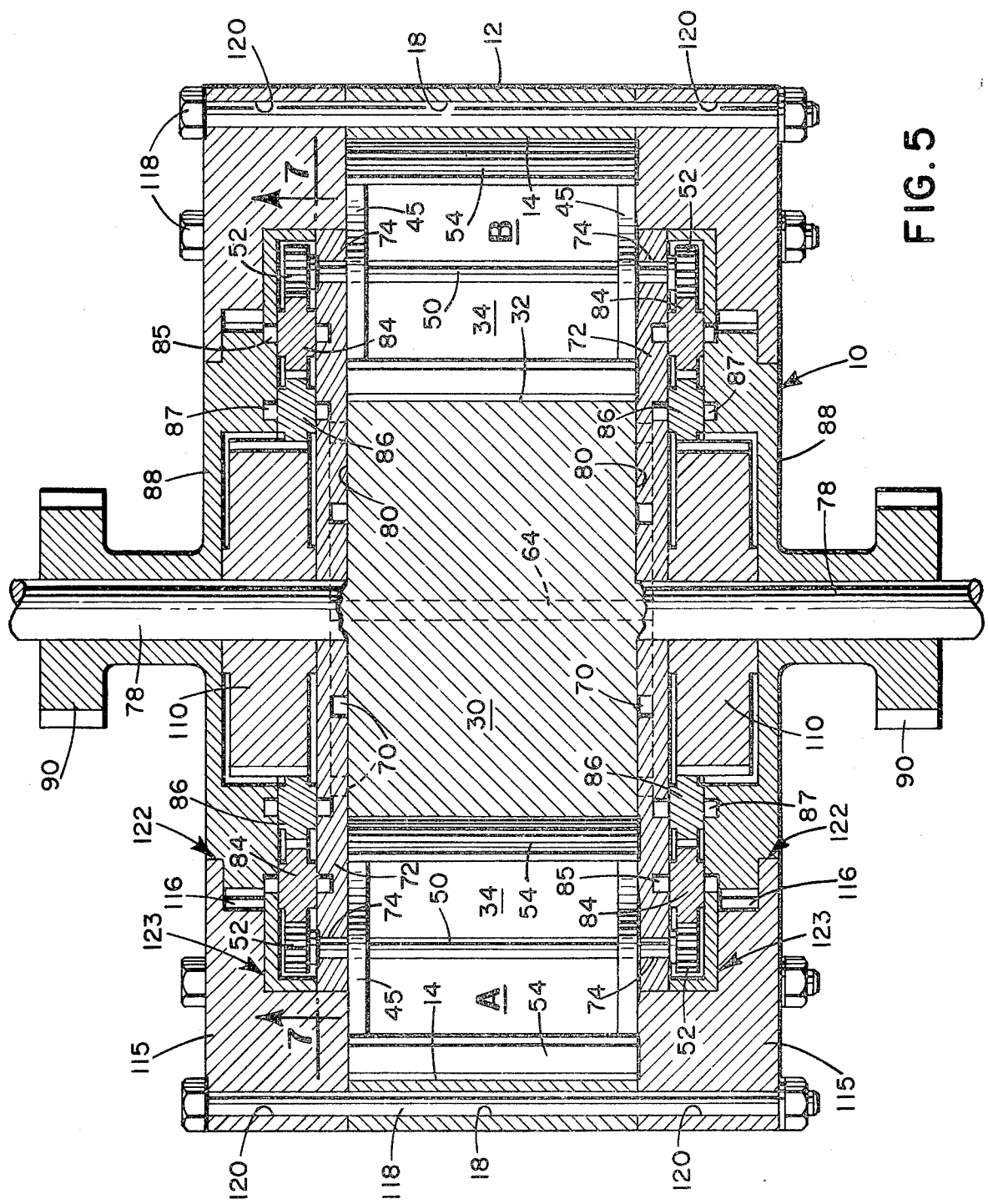
FIG. 5 is a view similar to FIG. 4 taken along line 5—5 of FIG. 1.

Referring to FIG. 5, wrist pins 50 included as part of pistons 34 extend through openings 74 included as part of rotatable crank plate 72. Crank plate 72 sealingly and rotatably engages a centrally disposed, longitudinally extending support rod 78. Crank plate 72 also is movable with respect to end faces 80 of central portion 30, and sealing means 47 included as part of pistons 34.

Figure 4:
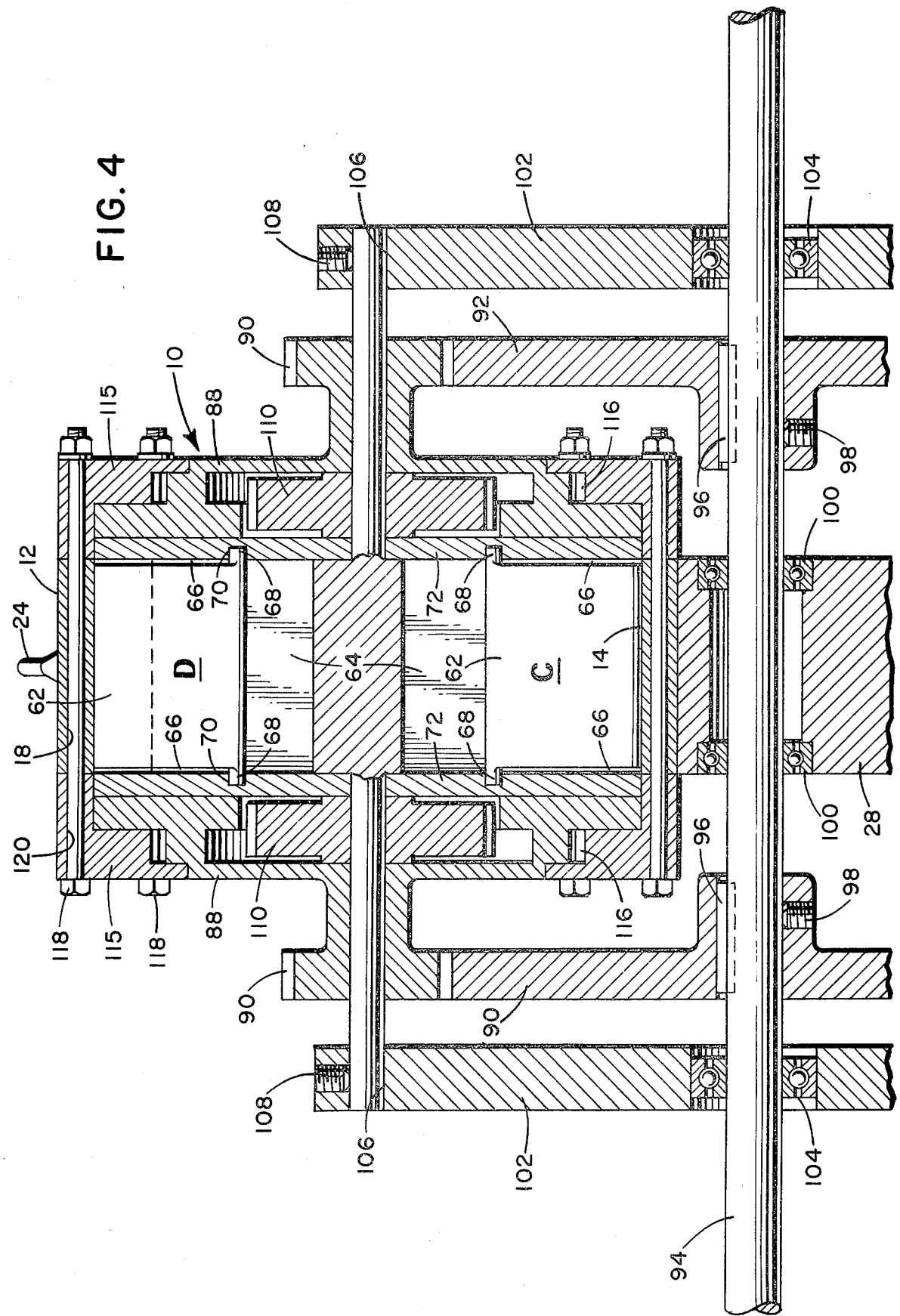
FIG. 4 is a view taken along line 4—4 of FIG. 1 showing the various gears and shafts employed as part of the present invention.
Figure 7:
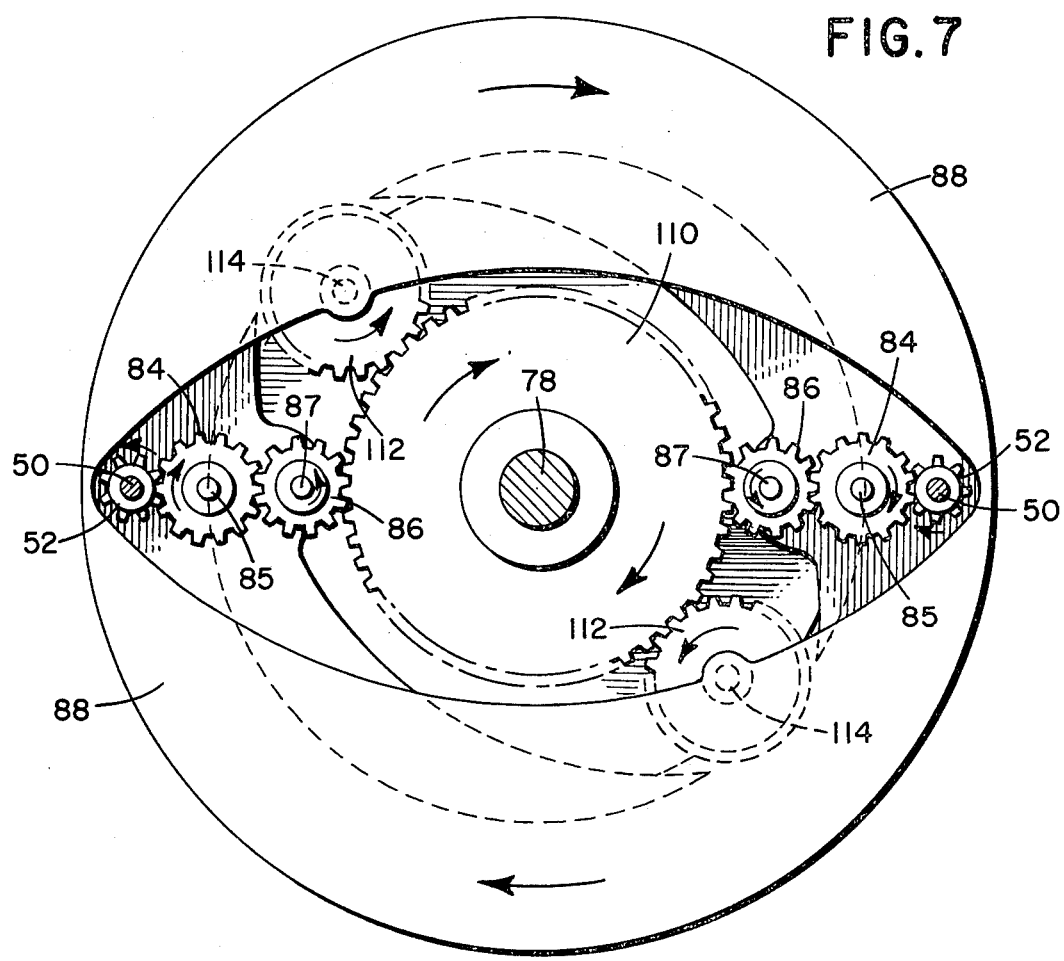
FIG. 7 is a view taken along line 7—7 of FIG. 5 and showing the drive means employed to maintain the orientation of the pistons with respect to a reference plane.

Crank plate 72 is disc-like and rotates about support rod 78. Hence, wrist pins 50 having gears 52 affixed to each end thereof orbit in a circular path about support rod 78. Referring to FIGS. 5 and 7, each gear 52 engages a spur gear 84 rotatably supported by pin 85 which is supported at its end by output hub 88 and crank plate 72. Gear 84 meshes with another spur gear 86 rotatably supported by pin 87 which, like pins 85, is supported at its end by output hub 88 and crank plate 72. Output hub 88, in turn, rotates about support rod 78 and includes spur gear 90. Referring to FIG. 4, gear 90 drives output gear 92 which is nonrotatably affixed to output shaft 94 by means of key 96 and set screw 98.

Three engine mounts are provided for engine 10. One of the engine mounts is manifold 28 which includes two bearings 100 disposed to rotatably support output shaft 94. The other engine mounts comprise support arms 102. Each arm 102 includes a bearing 104 at its central portion to rotatably support output shaft 94. The other end of support arm 102 includes an opening 106 adapted to receive support rod 78. Support rod 78 is retained within opening 106 and prevented from rotation by means of set screw 108.

Figure 6:
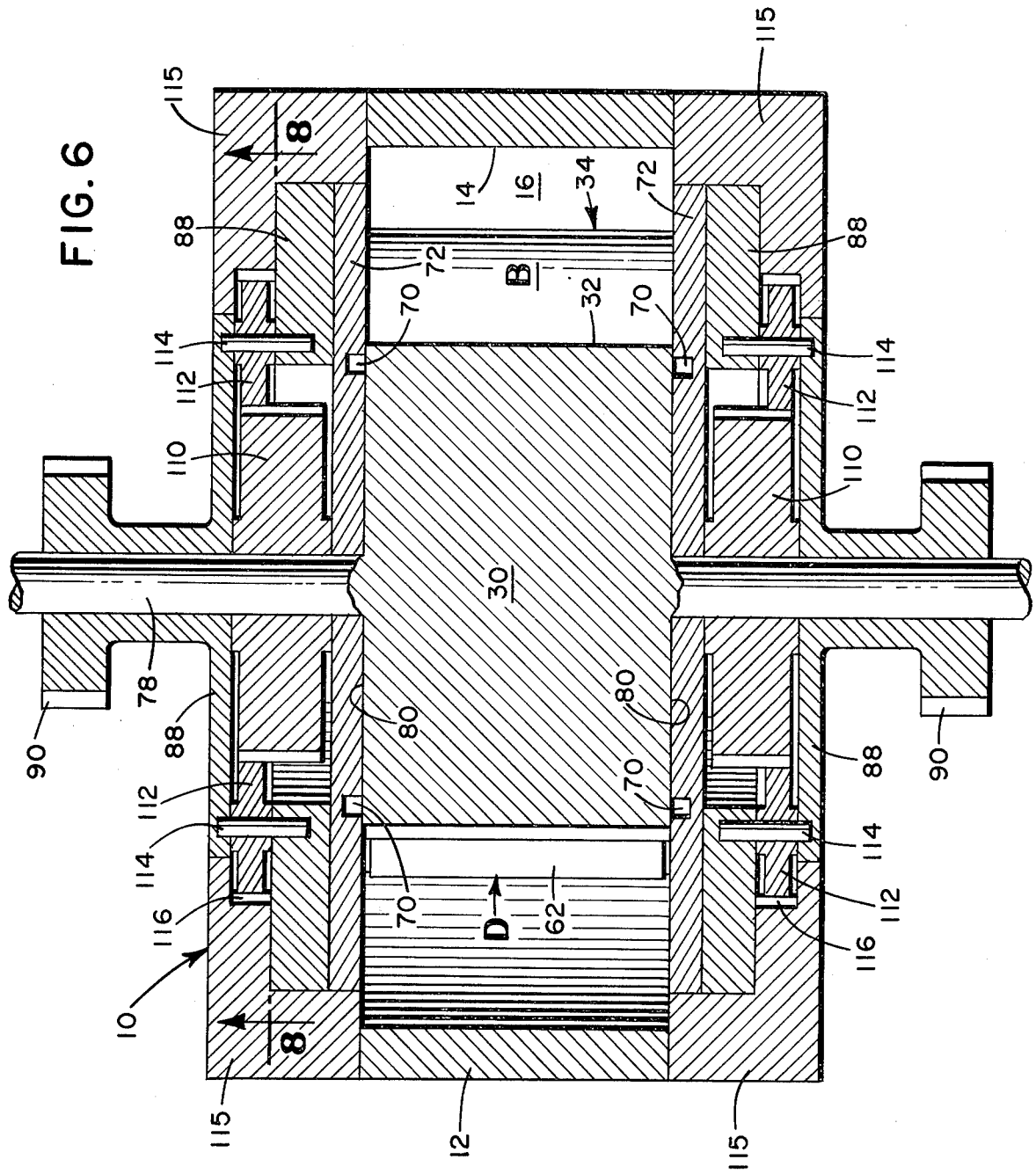
FIG. 6 is a view similar to FIG. 5 taken along line 6—6 of FIG. 1.
Figure 8:
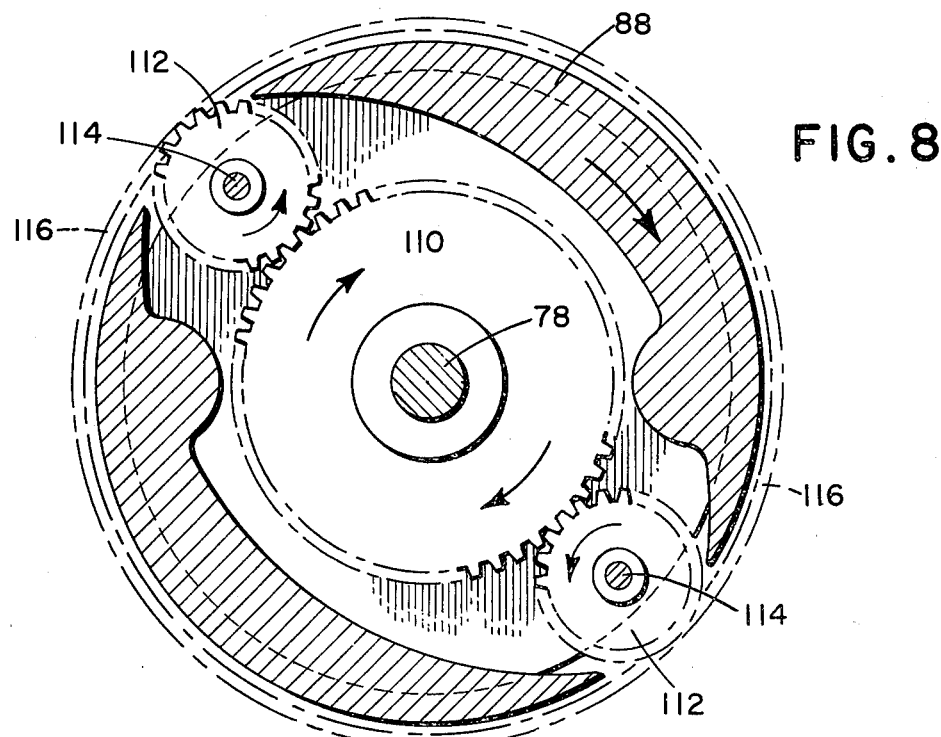
FIG. 8 is a view similar to FIG. 7 taken along line 8—8 of FIG. 6.

It has been shown that crank plate 72 chiefly is responsible for transmitting force from pistons 34 ultimately to output shaft 94 through pins 85 and 87 and output hub 88. Crank plate 72 also performs an important function in permitting pistons 34 to maintain their orientation with respect to a reference plane, in this case the horizontal, as they orbit about support rod 78. To achieve this result, gear 52 affixed to wrist pin 50 meshes with gear 84 which, in turn, meshes with gear 86. Gears 84 and 86 are carried by output hub 88 and crank plate 72 by means if pins 85 and 87. With only the apparatus just described, gears 52, 84, and 86, crank plate 72, pins 85 and 87, and output hub 88 would rotate about support rod 78 as a unit, precluding rotation of piston 34 as piston 34 orbits support rod 78. However, gear 86 also meshes with gear 110 rotatably disposed about support rod 78 intermediate crank plate 72 and output hub 88. Referring to FIG. 5, it is seen that gear 86 engages only a portion of the teeth of gear 110. Gear 110 also is engaged by gear 112, FIGS. 6 and 8, which gear 112 is rotatably supported by pin 114. Pin 114, in turn, is supported at both ends by output hub 88. Of course, the success of this mechanism depends upon the relative sizes of the gears and the characteristics of the gear teeth. The showing in the drawing is illustrative only, and does not attempt accurately to show the details of the gearing.

A stationary, annular collar 115 is disposed about the gear train just described at each side of engine 10 and includes an inwardly facing, stationary ring gear 116, which ring gear 116 engages gear 112. Bolted fasteners 118 extend transversely of engine 10, and retain collars 115 in place. It is seen that bolted fasteners 118 extend through openings 120 in collars 115 and also through bolt holes 18 in housing 12. By this construction, the engine may be assembled and disassembled conveniently so that ready access may be had to the gear train. It also will be observed that a rotatable seal is provided for the interface between output hub 88 and collar 115 as indicated generally at 122 and 123.

Engine 10 may be cooled by any conventional means including fins extending outwardly of collars 115 and housing 12 or by a recirculating water system. In a similar manner, sealing means for all surfaces moving relative to each other may be provided by any conventional means such as O-rings, plain end bearings, bushings, carbon seals, etc. All such details are thought to be well within the skill of the ordinary mechanic and need not be discussed further.

OPERATION

Each piston 34 of engine 10 performs a complete four-stroke cycle during one revolution of crank plate 72. This is best illustrated by FIGS. 1-3. FIG. 1 shows the pistons midway through a cycle. For purposes of illustration only, engine 10 has been illustrated as rotating clockwise in FIGS. 1-3. Piston A, due to the effective sealing action of sealing means 44 and 45, tends to create a vacuum within that portion of working chamber 16 in fluidic communication with intake port 20. The vacuum is maintained, additionally, because gate valve C is in a completely extended or closed position so as to tightly engage surface 14 of chamber 16. Hence, as piston A rotates clockwise, a mixture of combustible gases is drawn into chamber 16 through intake port 20. It will be pointed out that engine 10 could be fuel injected, if desired. In that case, only air would be drawn through intake 20 and fuel would be injected into the compressed air carried by pistons through an opening in housing 12 near the top thereof. Such an arrangement, however, is not necessary for the effective functioning of the engine.

On the other side of piston A, combustible gases previously drawn into chamber 16 are being compressed. This, again, is effected by the aforementioned seals, as well as gate valve D which is also in an extended or closed position to tightly engage surface 14 of chamber 16.

Piston B at the same time is moving clockwise. Combustion already has occurred within chamber 16 in the vicinity of ignition means 24. Hence, expanding gases have acted upon upper surface 38 of piston B so as to drive the piston downwardly as viewed in FIG. 1. Exhaust gases from a previous ignition are being pushed from chamber 16 by bottom surface 37 of piston B to exit chamber 16 through exhaust port 22. As with the intake and compression segments of the cycle noted previously, effective sealing during this phase is provided by the sealing members, as well as the gate valves.

Referring to FIG. 2, the pistons are shown in a position 90° clockwise from that shown in FIG. 1. During this interval, crank plate 72 also has rotated 90°. Because crank plate 72 includes track 70 which, in turn, engages pins 68 included as part of gate valves C and D, the gate valves have been retracted within slot 64 to an innermost or open position. This permits the pistons to pass the gate valves during orbit. Due to the shape of central portion 30, valve D is drawn into central portion 30 further than valve C. Both valves C and D, however, are displaced the same distance at the same time. The profile of track 70 is designed judiciously so that the gate valves are retracted an extremely short time before the leading edge of the pistons otherwise would impact them. Similarly, track 70 is designed judiciously so that the gate valves once again are extended so as to engage surface 14 of chamber 16 very shortly after the trailing edge of the pistons has passed beyond the gate valves.

As piston A approaches the top of the compression stroke, the compressed charge is trapped within the confines of pivoted sealing members 54, inner surface 14 of chamber 16, top face 38 of piston A, and crank plates 72. Sealing members 54 tightly engage surface 14 to retain the combustible gases. In this condition, piston A transports the charge through the open valve D (FIG. 2) to the expansion zone.

Piston B no longer is in engagement with surface 32 of central portion 30. The length of pivoted sealing members 54 is designed judiciously so that they clear the lowermost portion of central portion 30 during movement therepast. Arcuate bottom face 37 of piston B slidably engages surface 14 of chamber 16 in that position shown in FIG. 2. In this position, fluidic communication between intake port 20 and exhaust port 22 although appearing likely, is thought to be precluded, at least in part, by the inertia of the intake and exhaust gases. Mixing of the intake and exhaust gases also is minimized by the extremely short period of time in which piston B remains in the position shown in FIG. 2.

Referring to FIG. 3, the pistons have orbited about support rod 78 approximately 35° from that position shown in FIG. 2. Likewise, crank plate 72 has rotated approximately 35°. It is seen that the gate valves once again are extended to tightly engage surface 14 due to pins 68 having followed the profile of track 70. Combustion of the compressed gases carried by piston A has just occurred and piston B has commenced to draw a mixture of combustible gases into chamber 16 through intake port 20. It also will be observed that arcuate bottom face 37 of piston A is commencing to drive exhaust gases from the engine while piston B is commencing to compress the mixture of combustible gases drawn into the engine previously by piston A.

To insure effective functioning of seal means 44 and tip members 58 included as part of pistons 34, it is important that pistons 34 maintain their orientation with respect to a reference plane, in this case the horizontal. For this to occur, each piston 34 must rotate 360° in a counterclockwise direction about the longitudinal axis of wrist pin 50 for every clockwise orbit of piston 34 about support rod 78. Recalling the gear train described previously, and with particular reference to FIGS. 5–8, crank plate 72 is rotating clockwise, carrying with it wrist pins 50 and pins 85 and 87. Because output hub 88 is connected to pins 85 and 87, hub 88 also is rotating clockwise. Since ring gear 116 is included as part of collar 115, gear 116 is stationary, and gear 112 meshing therewith is caused to rotate counterclockwise. In turn, gear 110 is caused to rotate clockwise with the further result that gear 86 is caused to rotate counterclockwise. Continuing, gear 84 is caused to rotate clockwise and gear 52 is caused to rotate counterclockwise, as desired. The sizes of the gears must be chosen to provide gear ratios resulting in gear 52 rotating only once for each orbit of piston 34 about support rod 78. This choice of gear sizes is well within the skill of the ordinary mechanic and further details are thought unnecessary. It also will be pointed out that other types of drive means may be employed to rotate gear 52, such as a chain drive connected to a toothed portion of support rod 78. In short, any type of drive means may be employed to rotate gear 52, provided gear 52 rotates only once for each orbit.

As mentioned previously, inner surface 14 of housing 12 is elliptical and outer surface 32 of central portion 30 is generally elliptical when viewed from the side, with their major axes at right angles to each other. The dimensions must be chosen carefully to ensure proper engine operating characteristics. For example, if central portion 30 is too wide, tip 58 of sealing member 54 may disengage surface 32 in the vicinity of lower gate valve 62 for such a length of time that an improper flow of gases results. On the other hand, if central portion 30 is too narrow, the profile of track 70 may be such that unacceptable stresses are placed on pins 68 due to the required extremely rapid displacement of gate valves 62 in this condition. Moreover, if central portion 30 is not large enough, crank plate 72 may not transmit enough torque to output shaft 94 for proper engine operating characteristics. It has been found that a somewhat egg-shaped, generally elliptical configuration of central portion 30 produces acceptable results. It will be noted that the engine components must be sized with a view in mind of the job to be accomplished. Such considerations, however, clearly are within the capabilities of one skilled in the art, and further discussion is thought unnecessary.

While a specific embodiment of the invention has been described, it will be obvious to those skilled in the art that changes and modifications may be made without departing from the invention. It is therefore intended in the appended claims to cover all such changes and modifications that fall within the true spirit and scope of the invention.

I claim:

1. An internal combustion engine of the rotary type comprising:
   inner and outer housings and housing side plates having surfaces defining an annularly disposed working chamber,
   intake and exhaust openings in communication with said working chamber for permitting admission of combustible gases and exhaust of the products of combustion,
   first and second valves substantially oppositely positioned in said chamber for dividing said chamber into a compression zone and an expansion zone,
   at least one piston mounted in said chamber, means for effecting orbital movement of said piston within said chamber, said piston being movable relative to said inner and outer housings, said piston being operable to compress a charge of combustible gases while moving through said compression zone and to be driven through said expansion zone by the action of said combustible gases when ignited therein,
   power output means connected to said piston and driven thereby as said piston moves through said expansion zone,
   valve actuating means connected to said first and second valves for opening said valves to allow said piston to pass between said zones,
   means carried by said piston for containing the charge of compressed combustible gases from said compression zone and transporting said compressed combustible gases from said compression zone to said expansion zone, and
   ignitiion means for igniting said compressed combustible gases when said piston is in said expansion zone.

2. The engine of claim 1 wherein said inner housing has a generally elliptical outer surface and said outer housing has a generally elliptical inner surface, the major axes of said outer surface and said inner surface being perpendicular to one another.

3. The engine of claim 1 wherein said housing side plates are connected to said piston and move in rotation therewith, said housing side plates being a component of said power output means.

4. The engine of claim 1 wherein said valve actuating means are driven by said power output means.

5. The engine of claim 1 wherein said piston comprises a main section having inner and outer edges adapted to slidingly and sealingly engage the outer surface of said inner housing and the inner surface of said outer housing, respectively, during at least portions of the orbit of said piston in said chamber and a pair of sealing members pivotally attached to said center section and adapted to slidingly and sealingly engage the outer surface of said inner housing and the inner surface of said outer housing at least during portions of the orbit of said piston in said chamber.

6. The engine of claim 1 wherein said piston comprises a working surface for acting on and being acted on by said gases in said chamber, and wherein said engine further comprises means for maintaining said working surface in fixed relationship to a reference plane during the entire orbit of said piston through said chamber.

7. The engine of claim 2 wherein said housing side plates are rotationally movable with respect to said inner and outer housings and comprise a component of said power output means, and wherein said piston is supported on said side plates for orbital movement through said chamber, said piston driving said side plates when in said expansion zone.

8. The engine of claim 7 wherein said piston comprises sealing means engageable with the outer surface of said inner housing and the inner surface of said outer housing during at least the final portion of piston movement through said compression zone and the initial portion of piston movement through said expansion zone.

9. The engine of claim 8 wherein said piston comprises a working face which acts upon said gases to compress said gases in said compression zone and is acted upon by said ignited expanding gases in said expansion zone.

10. The engine of claim 9 further comprising piston orientation means for maintaining constant the orientation of said piston working face with respect to a fixed reference plane throughout the entire orbit of said piston.

11. The engine of claim 10 wherein said valves are positioned along the minor axis of said elliptical inner surface and wherein said piston working surface is maintained in an orientation substantially parallel to the major axis of said elliptical inner surface.

12. The engine of claim 11 wherein said piston further comprises first and second sealing members flanking said working face, said first sealing members being slidably and sealingly engageable with said outer surface during at least portions of the orbit of said piston and second sealing means being slidably and sealingly engageable with said inner surface during at least portions of the orbit of said piston, said sealing members being urged outwardly toward said surfaces.

13. The engine of claim 12 wherein said valves are mounted in said inner housing and are slidably movable between an open position and a closed position, and wherein said valve actuating means comprises a cam surface carried by each of said side plates and cam follower means on each of said valves and engaging said cam surface, said cam surface being so configured as to cause said valves to open immediately prior to the arrival of said piston at said valve and to close immediately subsequent to the passage of said piston thereby.

14. The engine of claim 13 wherein said piston orientation means comprises a train of gears having a first gear fixedly attached to said piston, a second gear fixedly attached to one of said housing, and at least one intermediate gear interposed between and in engagement with said first and second gears.

15. The engine of claim 14 wherein the radial distance between said outer surface and said inner surface at the major axis of said inner surface is substantially equal to that of said piston, and the radial distances between said inner and outer surfaces throughout the remainder of the orbital path is less than that of said piston.

* * * * *